US011204735B2

(12) United States Patent
Kline et al.

(10) Patent No.: US 11,204,735 B2
(45) Date of Patent: Dec. 21, 2021

(54) RECEIVING AUDIO FROM A LISTENING DEVICE ASSOCIATED WITH A SELECTED GEOGRAPHIC AREA

(71) Applicant: International Business Machines Corporation, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/275,889

(22) Filed: Feb. 14, 2019

(65) Prior Publication Data

US 2020/0264830 A1 Aug. 20, 2020

(51) Int. Cl.
| | |
|---|---|
| *G06F 17/00* | (2019.01) |
| *G06F 3/16* | (2006.01) |
| *H04W 4/02* | (2018.01) |
| *G01P 15/00* | (2006.01) |
| *G01C 9/00* | (2006.01) |
| *G06T 7/70* | (2017.01) |

(52) U.S. Cl.
CPC .............. *G06F 3/16* (2013.01); *H04W 4/023* (2013.01); *G01C 9/00* (2013.01); *G01P 15/00* (2013.01); *G06T 7/70* (2017.01)

(58) Field of Classification Search
CPC . G06F 3/16; H04W 4/023; G06T 7/70; G01C 9/00; G01P 15/00
USPC .......................................................... 700/94
See application file for complete search history.

(56) References Cited

U.S. PATENT DOCUMENTS

| 8,818,439 B2 | 8/2014 | Davis et al. | |
|---|---|---|---|
| 9,142,062 B2 | 9/2015 | Maciocci et al. | |
| 9,356,795 B2 | 5/2016 | Johnson | |
| 9,609,383 B1* | 3/2017 | Hirst | G06F 3/165 |
| 9,955,281 B1* | 4/2018 | Lyren | H04S 7/304 |
| 10,285,006 B2* | 5/2019 | Colonna | H04W 4/022 |

(Continued)

OTHER PUBLICATIONS

Minority Report Wikipedia entry (Year: 2018).*

(Continued)

*Primary Examiner* — Paul C McCord
(74) *Attorney, Agent, or Firm* — Cantor Colburn LLP; Tihon Poltavets (57) ABSTRACT

An example computer-implemented method includes receiving, by a processing device, a signal from a sensor of a user device associated with a user who is physically indicating at a geographic area, the signal including direction information and inclination information associated with the indicating. The method further includes determining, by the processing device, a direction the user is indicating based on the direction information. The method further includes determining, by the processing device, a distance that the user is indicating based on the inclination information. The method further includes determining, by the processing device, a specified geographic area based on the direction the user is indicating and the distance the user is indicating. The method further includes identifying, by the processing device, a listening device located in proximity to the specified geographic area. The method further includes enabling, by the processing device, the listening device to capture audio.

19 Claims, 7 Drawing Sheets

(56) References Cited

U.S. PATENT DOCUMENTS

| | | |
|---|---|---|
| 2013/0273948 A1 | 10/2013 | Tel-Or |
| 2014/0139454 A1 | 5/2014 | Mistry et al. |
| 2014/0201276 A1 | 7/2014 | Lymberopoulos et al. |
| 2015/0169076 A1* | 6/2015 | Cohen .................. G06F 3/0304 345/156 |
| 2015/0301592 A1* | 10/2015 | Miller .................... G06F 3/016 345/156 |
| 2015/0347827 A1 | 12/2015 | Dickinson et al. |
| 2016/0080684 A1* | 3/2016 | Farrell ................ H04N 9/8211 386/227 |
| 2017/0316803 A1* | 11/2017 | Vilermo ................. G01S 5/186 |
| 2018/0082244 A1* | 3/2018 | Brazeau .................... G06T 7/73 |
| 2018/0189913 A1* | 7/2018 | Knopp .................. G06Q 40/08 |
| 2018/0217804 A1* | 8/2018 | Manohar ............ G06K 9/00671 |
| 2019/0149919 A1* | 5/2019 | Mate ....................... G06F 3/167 381/74 |
| 2019/0205659 A1* | 7/2019 | Cuban ................ G06K 9/00778 |
| 2020/0307328 A1* | 10/2020 | Koster .................... B60D 1/36 |

OTHER PUBLICATIONS

A. O'Sullivan, "Multiphono: Relative positioning of co-located mobile devices." Computer Science University of Maryland, Scholarly Paper 9 (2014). (9 pages).

Derek Walter, "How to find songs by sound with Google Now's sound search" Greenbot, Jan. 23, 2015, <URL: https://www.greenbot.com/article/2873722/how-to-perform-song-searches-and-view-search-history-on-android-and-the-web.html> (8 pages).

G. Kortuem, et al., "Sensing and visualizing spatial relations of mobile devices." Proceedings of the 18th annual ACM symposium on User interface software and technology. ACM, 2005. (10 pages).

Google, "Identify songs playing near you" <URL: https://support.google.com/googleplay/answer/2913276?hl=en> [accessed: Feburary 13, 2019] (2 pages).

https://en.wikipedia.org/wiki/Fallout_from_the_Phil_Zone, last modified on Oct. 12, 2016, accessed Nov. 1, 2016.

J. Ojala, et al., "User-Created Content as Mediator of Co-located Social Experiences" Workshhop on Interactions and Applications for See-Through Technologies, in NordiCHI'14 conference, Helsinki, Oct. 27, 2014 (4 pages).

K. Luyten, et al., "Ad-hoc co-located collaborative work with mobile devices." Proceedings of the 9th international conference on Human computer interaction with mobile devices and services. ACM, 2007 (8 pages).

M. Hazas, et al. "A relative positioning system for co-located mobile devices." Proceedings of the 3rd international conference on Mobile systems, applications, and services. ACM, 2005. (14 pages).

Martin Lobao, "PSA: Google Sound Search Widget Won't Save Your Search History In Marshmallow Anymore" Android Police, Oct. 23, 2015, <URL: https://www.androidpolice.com/2015/10/23/psa-google-sound-search-widget-wont-save-your-search-history-in-marshmallow/> (8 pages).

Z. Lei, et al., "User-Selective Collaboration Maximizing Gain in Sum Rate," in Proc. IEEE Int. Symp. Personal, Indoor and Mobile Radio Commun., Tokyo, Japan, Sep. 2009, pp. 197-201.

* cited by examiner

RECEIVING AUDIO FROM A LISTENING DEVICE ASSOCIATED WITH A SELECTED GEOGRAPHIC AREA

BACKGROUND

The present invention generally relates to processing systems, and more specifically, to receiving audio from a listening device associated with a selected geographic area.

In areas in which people are gathered, various areas of localized sound or audio may be present. For example, at a convention or other gathering, various groups of people engage in conversations at different locations. Audio devices within and around the gathering area can capture audio, such as audio of these conversations. Such audio can be stored on and/or transmitted to processing systems.

SUMMARY

Embodiments of the present invention are directed to a computer-implemented method for receiving audio from a listening device associated with a selected geographic area. A non-limiting example of the computer-implemented method includes receiving, by a processing device, a signal from a sensor of a user device associated with a user who is physically indicating at a geographic area, the signal including direction information and inclination information associated with the indicating. The method further includes determining, by the processing device, a direction the user is indicating based on the direction information. The method further includes determining, by the processing device, a distance that the user is indicating based on the inclination information. The method further includes determining, by the processing device, a specified geographic area based on the direction the user is indicating and the distance the user is indicating. The method further includes identifying, by the processing device, a listening device located in proximity to the specified geographic area. The method further includes enabling, by the processing device, the listening device to capture audio.

Embodiments of the present invention are directed to a system. A non-limiting example of the system includes a memory comprising computer readable instructions and a processing device for executing the computer readable instructions for performing a method for receiving audio from a listening device associated with a selected geographic area.

Embodiments of the invention are directed to a computer program product. A non-limiting example of the computer program product includes a computer readable storage medium having program instructions embodied therewith. The program instructions are executable by a processor to cause the processor to perform a method for receiving audio from a listening device associated with a selected geographic area.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
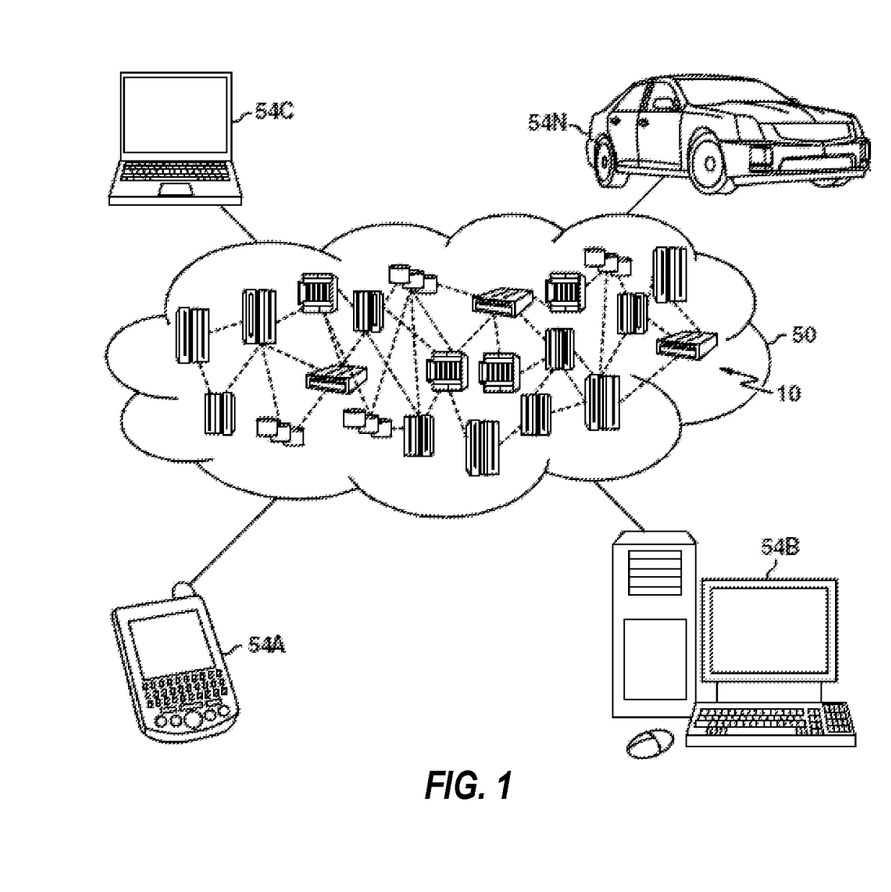
FIG. 1 depicts a cloud computing environment according to one or more embodiments described herein.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
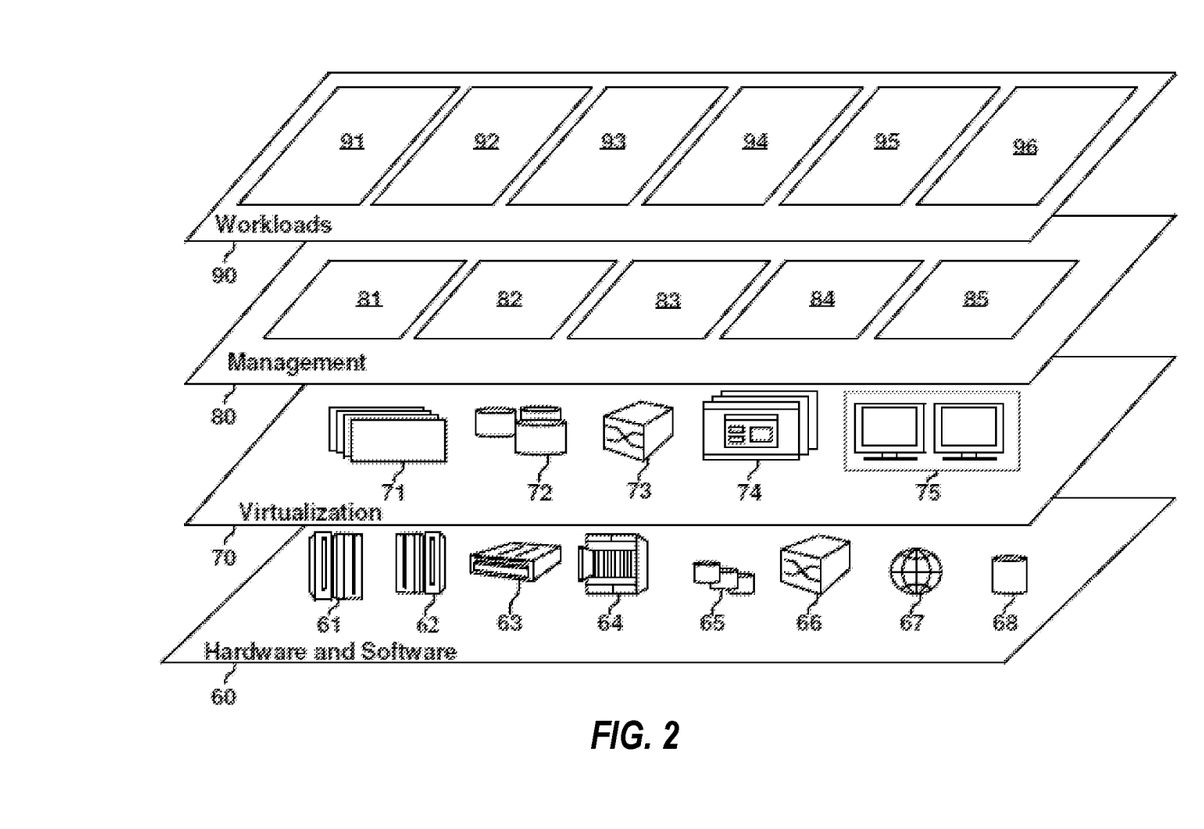
FIG. 2 depicts abstraction model layers according to one or more embodiments described herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and receiving audio from a device in a selected geographic area 96.

Figure 3:
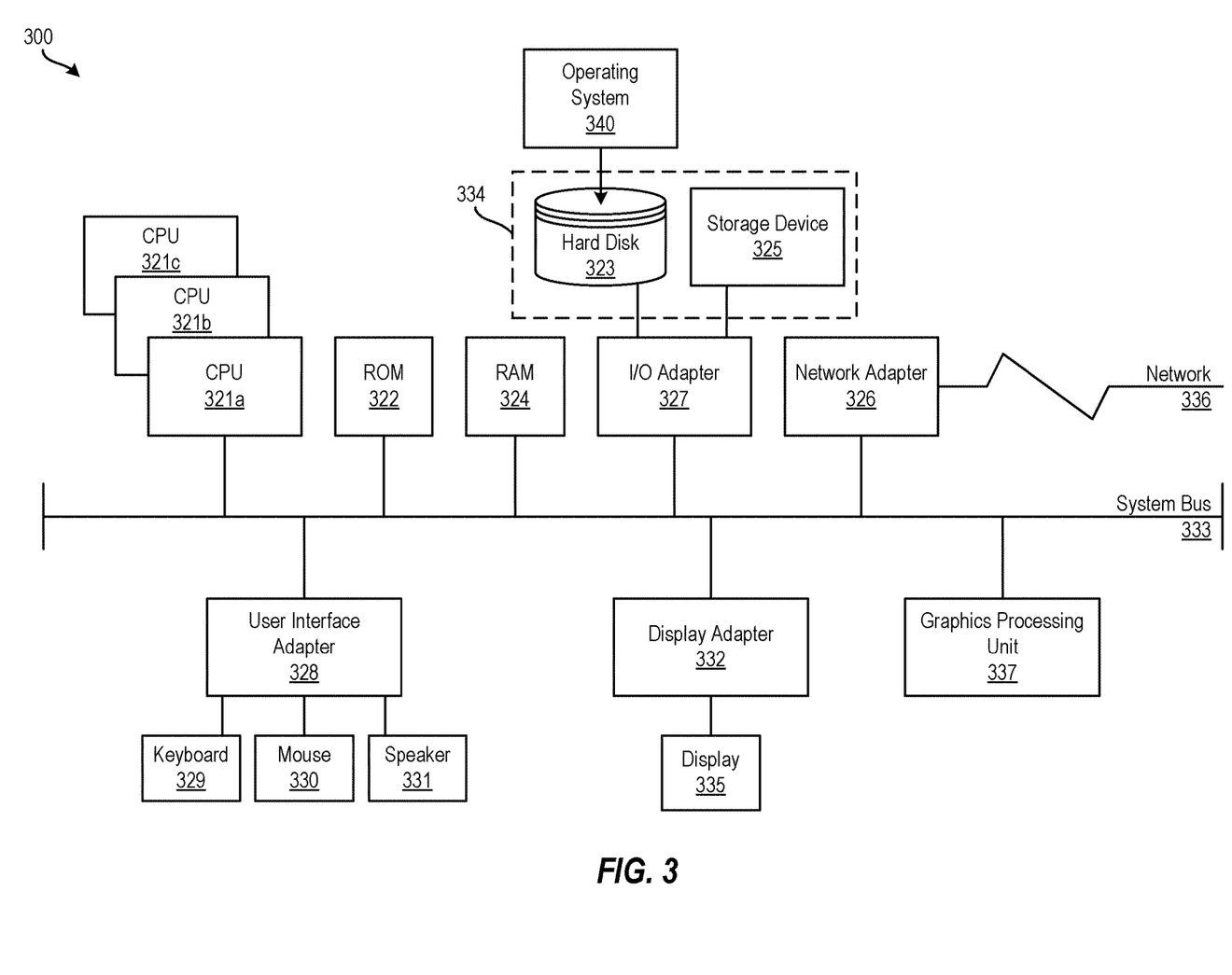
FIG. 3 depicts a block diagram of a processing system for implementing the presently described techniques according to one or more embodiments described herein.

It is understood that the present disclosure is capable of being implemented in conjunction with any other type of computing environment now known or later developed. For example, FIG. 3 depicts a block diagram of a processing system 300 for implementing the techniques described herein. In examples, processing system 300 has one or more central processing units (processors) 321a, 321b, 321c, etc. (collectively or generically referred to as processor(s) 321 and/or as processing device(s)). In aspects of the present disclosure, each processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further depicted are an input/output (I/O) adapter 327 and a network adapter 326 coupled to system bus 333. I/O adapter 327 may be a small computer system interface (SCSI) adapter that communicates with a hard disk 323 and/or a storage device 325 or any other similar component. I/O adapter 327, hard disk 323, and storage device 325 are collectively referred to herein as mass storage 334. Operating system 340 for execution on processing system 300 may be stored in mass storage 334. The network adapter 326 interconnects system bus 333 with an outside network 336 enabling processing system 300 to communicate with other such systems.

A display (e.g., a display monitor) 335 is connected to system bus 333 by display adapter 332, which may include a graphics adapter to improve the performance of graphics intensive applications and a video controller. In one aspect of the present disclosure, adapters 326, 327, and/or 332 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 330, and output capability including speaker 331 and display 335. In some aspects of the present disclosure, a portion of system memory (e.g., RAM 324) and mass storage 334 collectively store the operating system 340 such as the AIX® operating system from IBM Corporation to coordinate the functions of the various components shown in processing system 300.

Turning now to an overview of technologies that are more specifically relevant to one or more embodiments described herein, the present techniques receive audio from a device associated with a selected geographic area. In some situations, it is desirable to listen to localized audio for a particular geographic area. For example, in a public gathering, security personnel identifies a geographic area of interest and desires to listen to audio from that area, for example, to determine whether a security risk exists. Using the present techniques, the security personnel points in the direction of the geographic area and a listening device associated with that geographic area transmits audio to the security personnel. The present techniques analyze the "pointing" to determine a direction and distance used to define a selected geographic area. For example, pointing at 40° (up relative to the horizon), which may be determined by a tilt sensor, may correlate to a distance of 40 meters away from the user who is pointing. The direction of pointing can also be determined such as using a compass. Using the distance and direction, the selected geographic area is defined.

Although described in the context of security, the present techniques apply to other situations as well. For example, marketing or advertising personnel may desire to receive audio from a particular geographic area to determine what individuals in/near that geographic area are saying about a product or service.

Turning now to an overview of the aspects of the invention, one or more embodiments of the invention address the above-described shortcomings of the prior art by providing the ability to receive audio from a device associated with a selected geographic area. The selected geographic area is determined based on a user pointing to a geographic area of interest. The pointing indicates a distance and direction used to define the selected geographic area.

The above-described aspects of the invention address the shortcomings of the prior art by enabling a user to point at a geographic area of interest to select the geographic area for receiving audio from a listening device associated with that area. By merely pointing at a geographic area of interest, a selected geographic area is determined. A device (or devices, referred to as listening devices) within or near (e.g., 5 feet away, 8 feet away, etc.) are then determined and enabled to transmit audio captured within or near the selected geographic area.

Figure 4:
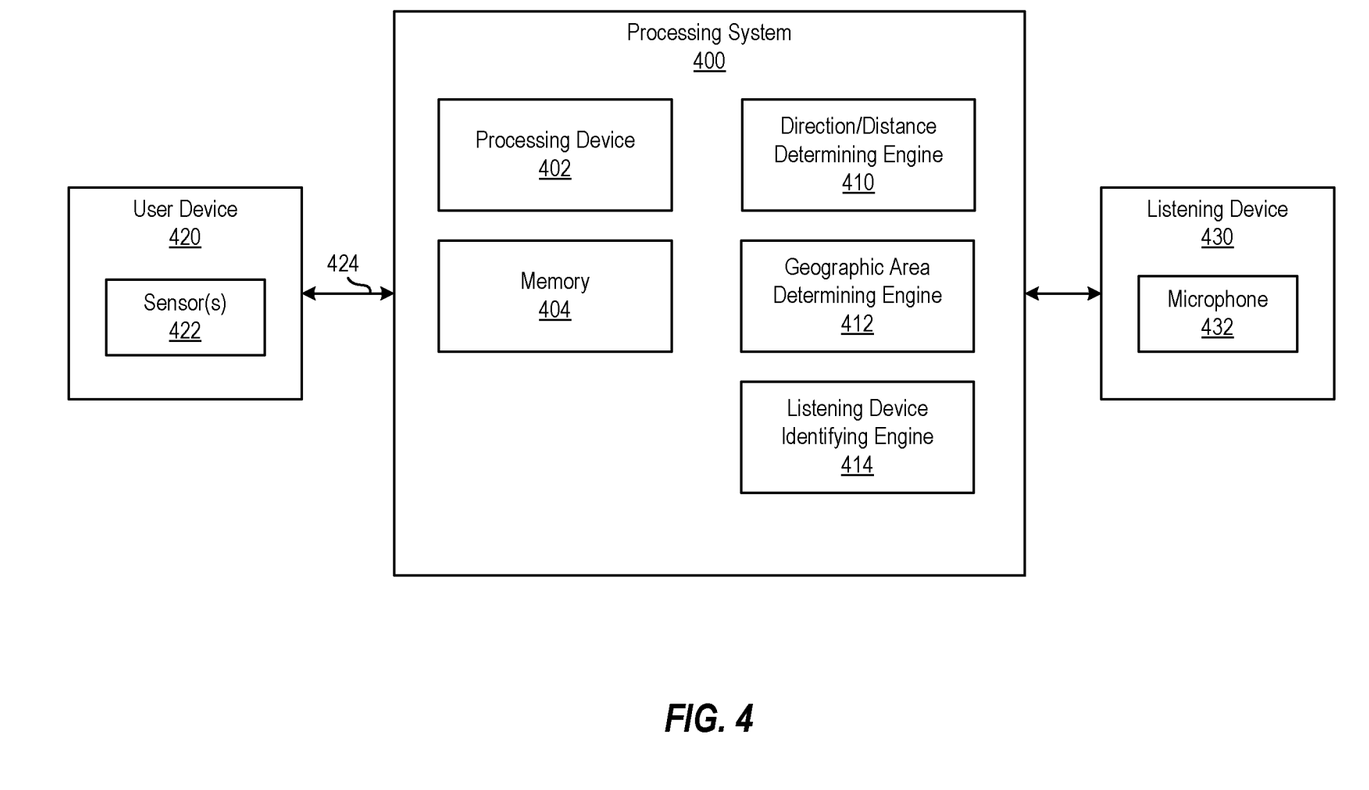
FIG. 4 depicts a block diagram of a processing system for receiving audio from a device associated with a selected geographic area according to one or more embodiments described herein.

Turning now to a more detailed description of aspects of the present invention, FIG. 4 depicts a block diagram of a processing system for receiving audio from a device associated with a selected geographic area according to one or more embodiments described herein. The processing system 400 includes a processing device 402, a memory 404, a direction/distance determining engine 410, a geographic area determining engine 414, and a listening device identifying engine 414.

The processing system 400 is communicatively couplable (either directly or indirectly, such as via a network) to a user device 420 and to a listening device 430. The user device 420 can be a smartphone, tablet computer, wearable computer (e.g., a smartwatch, fitness tracker), etc. The processing system 400 receives a signal 424 from sensor(s) 422 of the user device 420, which can be any suitable processing system or device. The sensor(s) 422 can be one or more sensors (i.e., a sensor array) and can include a camera, a compass, an accelerometer, a gyroscope, a tilt sensor, and the like, including combinations thereof. The processing system 400 also enables the listening device 430 to capture audio, such as using a microphone 432 in or associated with the listening device 430. According to one or more embodiments described herein, the processing system 400 and the user device 420 are the same device.

The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 402 for executing those instructions. Thus a system memory (e.g., memory 404) can store program instructions that when executed by the processing device 402 implement the engines described herein. Other engines can also be utilized to include other features and functionality described in other examples herein.

The processing system 400 is used for receiving audio from the listening device 430 associated with a selected geographic area. To do this, a user indicates (i.e., points) to a geographic area of interest using a hand/arm or other appendage or device (and possibly a hand/finger gesture) to define an area range as a selected geographic area. Once the geographic area is selected, the listening device 430 within or near the selected geographic area is enabled to capture audio, which is then transmitted to the processing system 400, to the cloud computing environment 50, or another suitable location to enable the user to listen to the audio.

Figure 5:
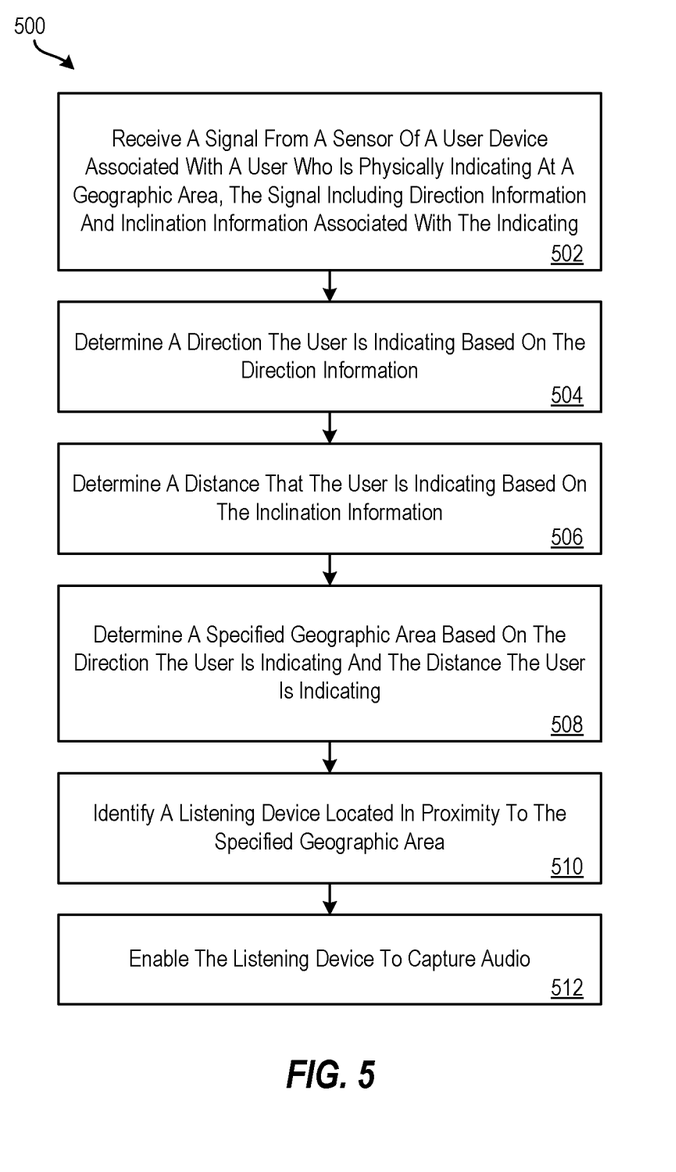
FIG. 5 depicts a flow diagram of a method for receiving audio from a listening device associated with a selected geographic area according to one or more embodiments described herein.

The features and functionality of the engines 410, 412, and 414, as well as the other elements of FIG. 4, are now described with reference to FIGS. 5, 6 and 7A-7D. In particular, FIG. 5 depicts a flow diagram of a method 500 for receiving audio from a device associated with a selected geographic area according to one or more embodiments described herein. The method 500 can be performed using any suitable processing system (e.g., the cloud computing environment 50, the processing system 300, the processing system 400) and/or processing device (e.g., the processing device 321, the processing device 402) or the like.

Figure 6:
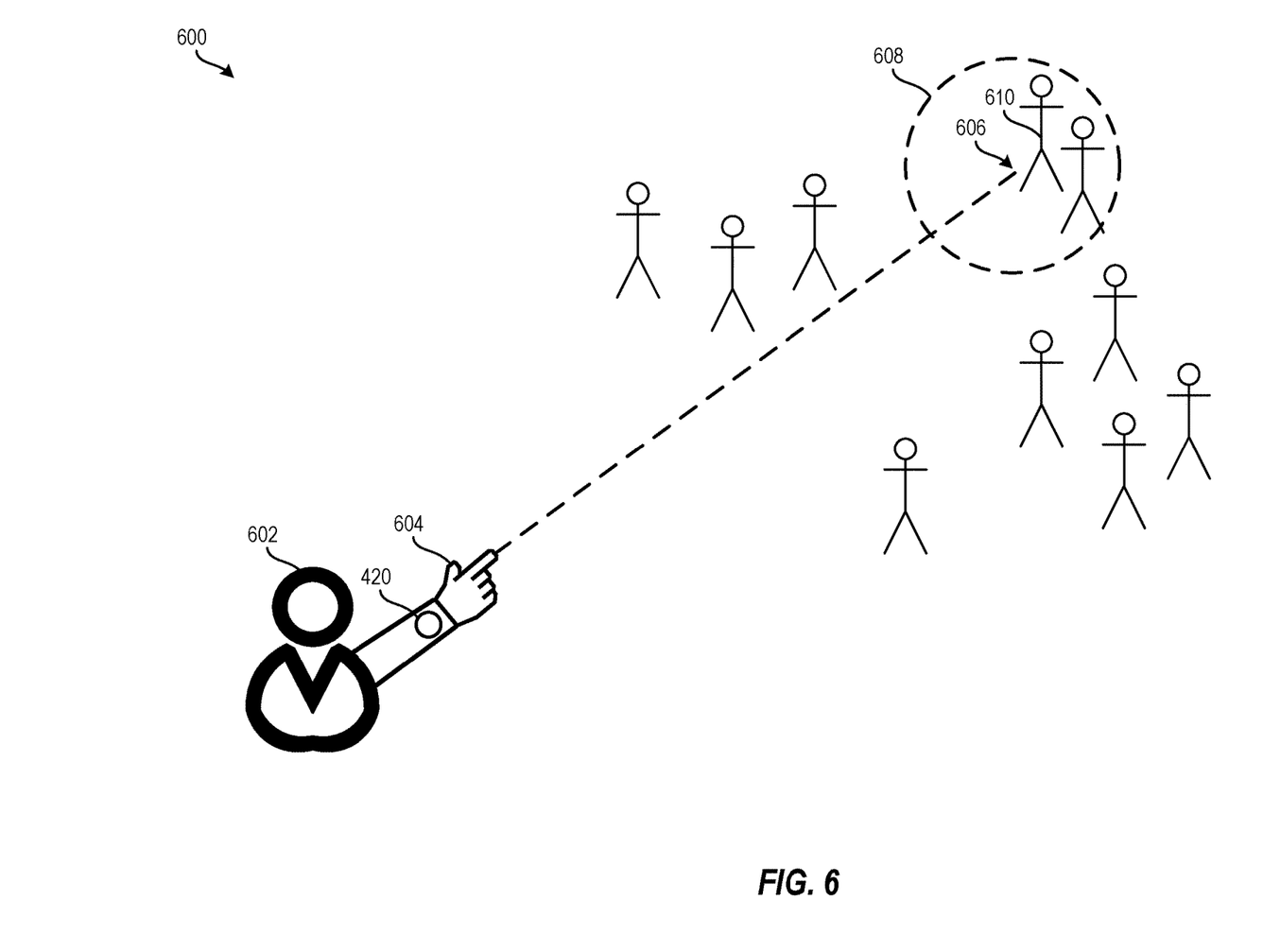
FIG. 6 depicts a user indicating a geographic area of interest according to one or more embodiments described herein.

At block 502, the processing system 400 receives a signal 424 (or multiple signals) from one or more sensor(s) 422 of a user device 420 associated with a user who is physically indicating at a geographic area. As depicted in FIG. 6 a user 602 indicating includes a user pointing, signaling, or otherwise denoting a geographic area of interest 606. For example, the user 602 of FIG. 6 points an arm 604 at the geographic area of interest 606. In this example, the user device 420 such as (a smartwatch or other similar or suitable processing system), which includes the one or more sensor(s) 422, is worn or held by the user 600. When the user indicates at the geographic area of interest 606, the sensor(s) 422 generate a signal (or signals) 424 that includes direction information and inclination information associated with the indicating.

With continued reference to FIG. 5, the sensor(s) 422 can be one or more sensors (i.e., a sensor array) and can include a camera, a compass, an accelerometer, a gyroscope, a tilt sensor, and the like, including combinations thereof. The signal 424 generated by the sensor(s) 422 includes direction information and inclination information associated with the indicating. For example, direction information includes a direction from a compass sensor (e.g., north, south-southeast, 247°, 45°, etc.). As an example, the inclination information includes an angle of inclination relative to horizontal (or another reference), such as 20° above the horizon, 9° above the horizon, etc. detected by a tilt sensor. Other direction information and/or inclination information can be used in other embodiments, and other types of sensors can be implemented.

At block 504, the direction/distance determining engine 410 of the processing system 400 determines a direction the user is indicating based on the direction information. For example, the direction/distance determining engine 410 analyzes the signal 424 to determine the direction the user is indicating. The direction is a compass direction, for example.

Figure 7A:
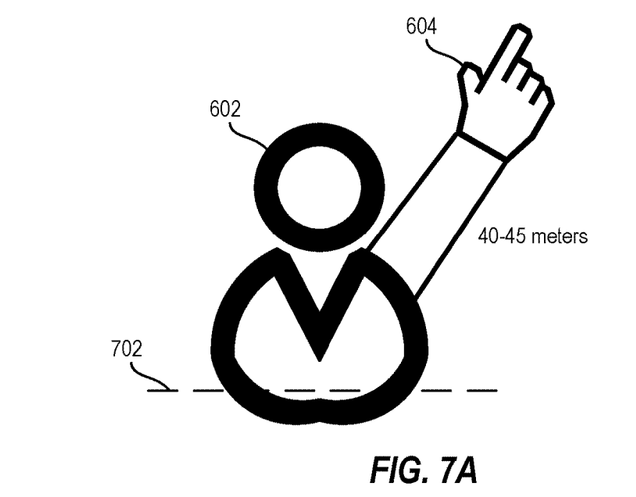
FIGS. 7A, 7B, 7C, and 7D depict a user with varying inclination angles of the user's arm according to one or more embodiments described herein.
Figure 7B:
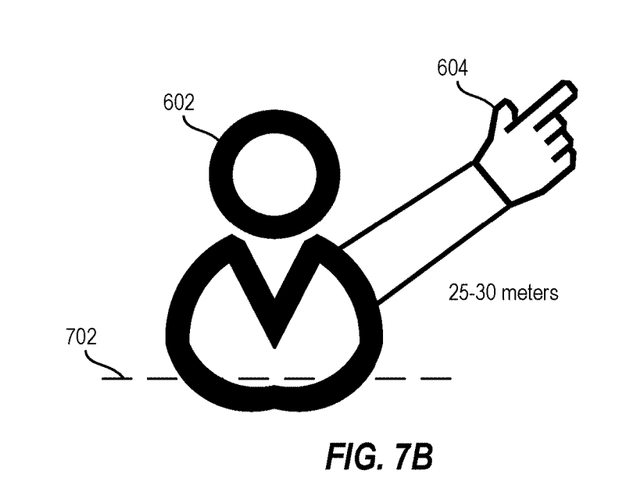
Figure 7C:
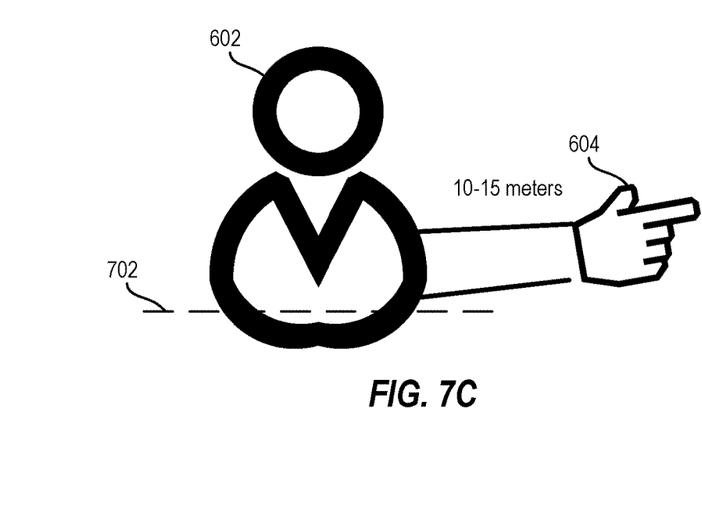
Figure 7D:
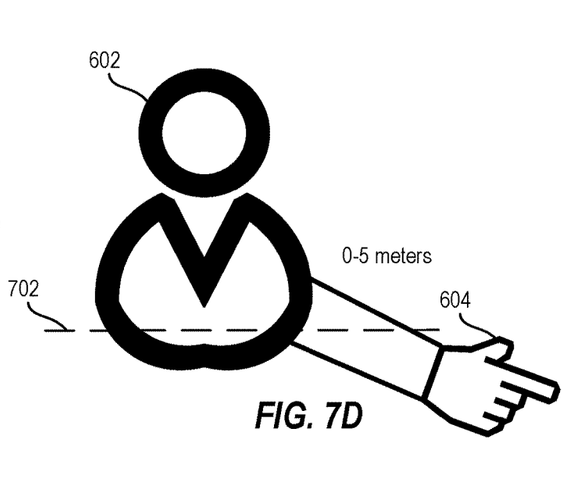

At block 506, the direction/distance determining engine 410 of the processing system 400 determines a distance that the user is indicating based on the inclination information. For example, the direction/distance determining engine 410 analyzes the signal 424 to determine the distance that the user is indicating. The distance is determined based on an inclination angle of the user's arm, for example. FIGS. 7A, 7B, 7C, 7D depict the user 602 with varying inclination angles of the user's arm 604. In FIG. 7A, the arm 604 of the user 602 is at an approximate 60° angle of inclination relative to horizontal line 702. FIGS. 7B, 7C, and 7D depict other examples of inclination angles of the user's arm 604 such as approximately 40° relative to horizontal line 702 (FIG. 7B), approximately 10° relative to horizontal line 702 (FIG. 7C), and approximately −20° (or) 340° relative to horizontal line 702 (FIG. 7D). Each inclination angle corresponds to different distances from the user 602. Examples of such correlation between the inclination angle and distance from the user 602 are depicted in the following table:

| Angle of Inclination | Distance |
| --- | --- |
| 60° | 40-45 meters |
| 40° | 25-30 meters |
| 10° | 10-15 meters |
| −20° | 0-5 meters |

It should be appreciated that other correlations between the inclination angle and distance from the user 602 are possible, and that the preceding table is merely an example. In various embodiments, the user 602 defines the inclination angle to distance correlation, it is defined automatically, it is defined by another user, it is learned over time (e.g., using machine learning techniques), etc.

At block 508, the geographic area determining engine 412 of the processing system 400 determines a specified geographic area based on the direction the user is indicating and the distance the user is indicating. For example, using the correlation of the above table, the geographic area determining engine 412 determines that the specified geographic area is 40-45 meters away from the user 602 (in the example of FIG. 7A) and the direction is based on the signal from the compass (sensor 422) of the user device 420. As an example, if the user is pointing southeast at 40° inclination, the geographic area determining engine 412 determines the specified geographic area as being approximatel5 25-30 meters away from the user 602 in the direction southeast.

According to one or more embodiments described herein, with reference to FIG. 6, a radius of the specified geographic area 608 is predefined and/or set by the user 602. In such cases, the method 500 further includes receiving a second signal from the sensor of the user device, the signal including area information for determining an area (i.e., size) of the specified geographic area, and determining the area (i.e., size) of the specified geographic area based at least in part on the second signal. For example, the radius of the specified geographic area 608 defaults to a predefined value (e.g., 1 meter, 3 meters, etc.). However, according to one or more embodiments described herein, the user 602 uses a gesture, movement, or other input to set or change the radius of the specified geographic area 608. For example, the user flicks a finger up as an indication that the radius should increase or flicks a finger sidewise as an indication that the radius should decrease. Of course, other indications can be used to define the radius of the specified geographic area 608. These indications are detectable, for example, by the sensor(s) 422, such as an accelerometer or a camera.

At block 510, the listening device identifying engine 414 of the processing system 400 identifies a listening device (e.g., the listening device 430) located in proximity to the specified geographic area. For example, the listening device identifying engine 414 uses global positioning system (GPS) location information to determine a position of the processing system 400 and then determines a location of the specified geographic area 608. Although GPS information is used in some examples, other techniques for determining location can also be used, such as Wi-Fi positioning, cellular positioning, or other geolocation techniques. Using this information, the listening device identifying engine 414 locates a listening device (e.g., the listening device 430) at or near the location of the specified geographic area 608. For example, in the embodiment of FIG. 6, a user 610 has a smartphone, which can be a listening device.

At block 512, the listening device identifying engine 414 of the processing system 400 enables the listening device 430 to capture audio. For example, the processing system 400 sends a command to the listening device 430 to begin capturing audio using a microphone 432 associated with the listening device 430. In some examples, more than one listening device is enabled to capture audio. In such cases, the audio can be stored and compared manually and/or using language processing techniques. According to one or more embodiments described herein, a user associated with the listening device 430 is prompted to enable the audio capture; however, in other embodiments, enabling the audio capture is performed automatically by the processing system 400.

Additional processes also may be included, and it should be understood that the process depicted in FIG. 5 represents an illustration, and that other processes may be added or existing processes may be removed, modified, or rearranged without departing from the scope and spirit of the present disclosure.

Example embodiments of the disclosure include or yield various technical features, technical effects, and/or improvements to technology. Example embodiments of the disclosure provide techniques for receiving audio from a listening device associated with a selected geographic area by determining a direction and a location where a user is indicating/pointing and enabling a listening device within (or near) the selected geographic area to capture audio. These aspects of the disclosure constitute technical features that yield the technical effect of capturing audio at a selected geographic area and transmitting it to a user to enable a user to remotely monitor audio. As a result of these technical features and technical effects, a system in accordance with example embodiments of the disclosure represents an improvement to existing audio capture techniques. It should be appreciated that the above examples of technical features, technical effects, and improvements to technology of example embodiments of the disclosure are merely illustrative and not exhaustive.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising: receiving, by a processing device, a signal from a sensor of a user device associated with a first user who is physically indicating at a geographic area, the signal including direction information and inclination information associated with the indicating; determining, by the processing device, a direction the first user is indicating based on the direction information; determining, by the processing device, a distance away from the first user that the first user is indicating based on the inclination information, wherein the inclination information comprises an angle of inclination of an arm of the first user as sensed by the sensor of the user device, the angle of inclination being selected from one of a plurality of preset angles of inclination, each of the plurality of preset angles of inclination having a relationship to an associated distance away from the first user that the first user is indicating
   determining, by the processing device, a specified geographic area based on the direction the first user is indicating, the distance away from the first user that the first user is indicating, and a radius, the radius being defined based on a second signal generated based on a gesture of the first user; identifying, by the processing device, a first listening device located in proximity to the specified geographic area; identifying, by the processing device, a second listening device located in the proximity to the specified geographic area; enabling, by the processing device, the first listening device to capture a first audio recording subsequent to a second user associated with the first listening device authorizing the first listening device to capture the first audio recording; enabling, by the processing device, the second listening device to capture a second audio recording automatically; and comparing, by the processing device, the first audio recording and the second audio recording.

2. The computer-implemented method of claim 1, wherein identifying the first listening device comprises identifying one of a plurality of listening devices within the specified geographic area.

3. The computer-implemented method of claim 1, wherein the first listening device comprises a microphone.

4. The computer-implemented method of claim 1, wherein the sensor comprises an accelerometer.

5. The computer-implemented method of claim 1, wherein the sensor comprises a tilt sensor.

6. The computer-implemented method of claim 1, wherein the sensor is a sensor array, the sensor array comprising an accelerometer and a tilt sensor, and wherein the signal comprises a first signal and a third signal, the first signal being received from the accelerometer and the third signal being received from the tilt sensor.

7. The computer-implemented method of claim 1, wherein the sensor is a camera, and wherein the processing device performs image processing on an image captured by the camera to generate the signal.

8. The computer-implemented method of claim 1, further comprising:
   receiving, by the processing device, the first audio recording from the first listening device; and
   receiving, by the processing device, the second audio recording from the second listening device.

9. The computer-implemented method of claim 1, wherein the first listening device transmits the captured audio to a cloud computing environment.

10. A system comprising: a memory comprising computer readable instructions; and a processing device for executing the computer readable instructions for performing a method comprising: receiving, by the processing device, a signal from a sensor of a user device associated with a first user who is physically indicating at a geographic area, the signal including direction information and inclination information associated with the indicating; determining, by the processing device, a direction the first user is indicating based on the direction information; determining, by the processing device, a distance away from the first user that the first user is indicating based on the inclination information, wherein the inclination information comprises an angle of inclination of an arm of the first user as sensed by the sensor of the user device, the angle of inclination selected from one of a plurality of preset angles of inclination, each of the plurality of preset angles of inclination having a relationship to an associated distance away from the first user that the first user is indicating
   determining, by the processing device, a specified geographic area based on the direction the first user is indicating, the distance away from the first user that the first user is indicating, and a radius, the radius being defined based on a second signal generated based on a gesture of the first user; identifying, by the processing device, a first listening device located in proximity to the specified geographic area; identifying, by the processing device, a second listening device located in the proximity to the specified geographic area; enabling, by the processing device, the first listening device to capture a first audio recording subsequent to a second user associated with the first listening device authorizing the first listening device to capture the first audio recording; enabling, by the processing device, the second listening device to capture a second audio recording automatically; and comparing, by the processing device, the first audio recording and the second audio recording.

11. The computer-implemented method of claim 10, wherein identifying the first listening device comprises identifying one of a plurality of listening devices within the specified geographic area.

12. The computer-implemented method of claim 10, wherein the first listening device comprises a microphone.

13. The computer-implemented method of claim 10, wherein the sensor comprises an accelerometer.

14. The computer-implemented method of claim 1, wherein the sensor comprises a tilt sensor.

15. The computer-implemented method of claim 10, wherein the sensor is a sensor array, the sensor array comprising an accelerometer and a tilt sensor, and wherein the signal comprises a first signal and a third signal, the first signal being received from the accelerometer and the third signal being received from the tilt sensor.

16. The computer-implemented method of claim 10, wherein the sensor is a camera, and wherein the processing device performs image processing on an image captured by the camera to generate the signal.

17. The computer-implemented method of claim 10, wherein the method further comprises:
 receiving, by the processing device, the first audio recording from the first listening device; and
 receiving, by the processing device, the second audio recording from the second listening device.

18. A computer program product comprising: a computer readable storage medium having program instructions embodied therewith, the program instructions executable by a processing device to cause the processing device to perform a method comprising: receiving, by the processing device, a signal from a sensor of a user device associated with a first user who is physically indicating at a geographic area, the signal including direction information and inclination information associated with the indicating; determining, by the processing device, a direction the first user is indicating based on the direction information; determining, by the processing device, a distance away from the first user that the first user is indicating based on the inclination information, wherein the inclination information comprises an angle of inclination of an arm of the first user as sensed by the sensor of the user device, the angle of inclination selected from one of a plurality of preset angles of inclination, each of the plurality of preset angles of inclination having a relationship to an associated distance away from the first user that the first user is indicating determining, by the processing device, a specified geographic area based on the direction the first user is indicating, the distance away from the first user that the first user is indicating, and a radius, the radius being defined based on a second signal generated based on a gesture of the user; identifying, by the processing device, a first listening device located in proximity to the specified geographic area; identifying, by the processing device, a second listening device located in the proximity to the specified geographic area; enabling, by the processing device, the first listening device to capture a first audio recording subsequent to a second user associated with the first listening device authorizing the first listening device to capture the first audio recording; enabling, by the processing device, the second listening device to capture a second audio recording automatically; and comparing, by the processing device, the first audio recording and the second audio recording.

19. The computer-implemented method of claim 1, wherein the gesture is one of a first gesture or a second gesture, wherein the first gesture indicates to increase the radius from a predefined value, and wherein the second gesture indicates to decrease the radius from the predefined value.

* * * * *